United States Patent
Ohno et al.

(10) Patent No.: US 8,227,368 B2
(45) Date of Patent: Jul. 24, 2012

(54) HONEYCOMB STRUCTURE

(75) Inventors: Kazushige Ohno, Gifu (JP); Takahiko Ido, Gifu (JP); Ken Yoshimura, Gifu (JP)

(73) Assignee: Ibiden Co., Ltd., Ogaki-Shi (JP)

( * ) Notice: Subject to any disclaimer, the term of this patent is extended or adjusted under 35 U.S.C. 154(b) by 381 days.

(21) Appl. No.: 12/346,628

(22) Filed: Dec. 30, 2008

(65) Prior Publication Data

US 2009/0291837 A1 Nov. 26, 2009

(30) Foreign Application Priority Data

May 20, 2008 (WO) .................. PCT/JP2008/059260

(51) Int. Cl.
*B01J 29/06* (2006.01)
(52) U.S. Cl. ......................................................... 502/71
(58) Field of Classification Search .................. None
See application file for complete search history.

(56) References Cited

U.S. PATENT DOCUMENTS

| | | | |
|---|---|---|---|
| 5,116,586 A | | 5/1992 | Baacke et al. |
| 5,271,913 A | * | 12/1993 | Iida et al. .................. 423/213.2 |
| 2006/0068159 A1 | * | 3/2006 | Komori et al. ............... 428/116 |
| 2006/0292044 A1 | | 12/2006 | Ohno et al. |
| 2006/0292335 A1 | | 12/2006 | Ohno et al. |
| 2006/0292339 A1 | * | 12/2006 | Ohno et al. .................. 428/116 |
| 2007/0259770 A1 | * | 11/2007 | Hofmann et al. ............... 502/60 |

FOREIGN PATENT DOCUMENTS

| | | |
|---|---|---|
| CN | 1414881 | 4/2003 |
| EP | 1803494 | 7/2007 |
| EP | 1974797 | 10/2008 |
| EP | 1977818 | 10/2008 |
| EP | 2105182 | 9/2009 |
| EP | 2105197 | 9/2009 |
| EP | 2105423 | 9/2009 |
| EP | 2105426 | 9/2009 |
| WO | WO 01/49409 | 7/2001 |
| WO | WO 2005/063653 | 7/2005 |
| WO | WO 2006/137149 | 12/2006 |
| WO | WO 2006/137158 | 12/2006 |

OTHER PUBLICATIONS

Chinese Office Action for corresponding CN Application No. 200910135063.7, Apr. 13, 2011.

* cited by examiner

*Primary Examiner* — Emily Le
*Assistant Examiner* — Michael Forrest
(74) *Attorney, Agent, or Firm* — Ditthavong Mori & Steiner, P.C.

(57) ABSTRACT

A honeycomb structure includes honeycomb units. Each of the honeycomb units has a longitudinal direction and includes inorganic particles, an inorganic binder, and cell walls defining cells extending along the longitudinal direction from one end face to another end face. The honeycomb units are bonded together via an adhesive such that each longitudinal direction is substantially in parallel. An amount of ammonia desorbed per unit mass of the honeycomb units is about 5 to about 100 times greater than an amount of ammonia desorbed per unit mass of the adhesive. The amount of ammonia desorbed per unit mass of the honeycomb units and the amount of ammonia desorbed per unit mass of the adhesive are measured by an $NH_3$-TPD method.

28 Claims, 5 Drawing Sheets

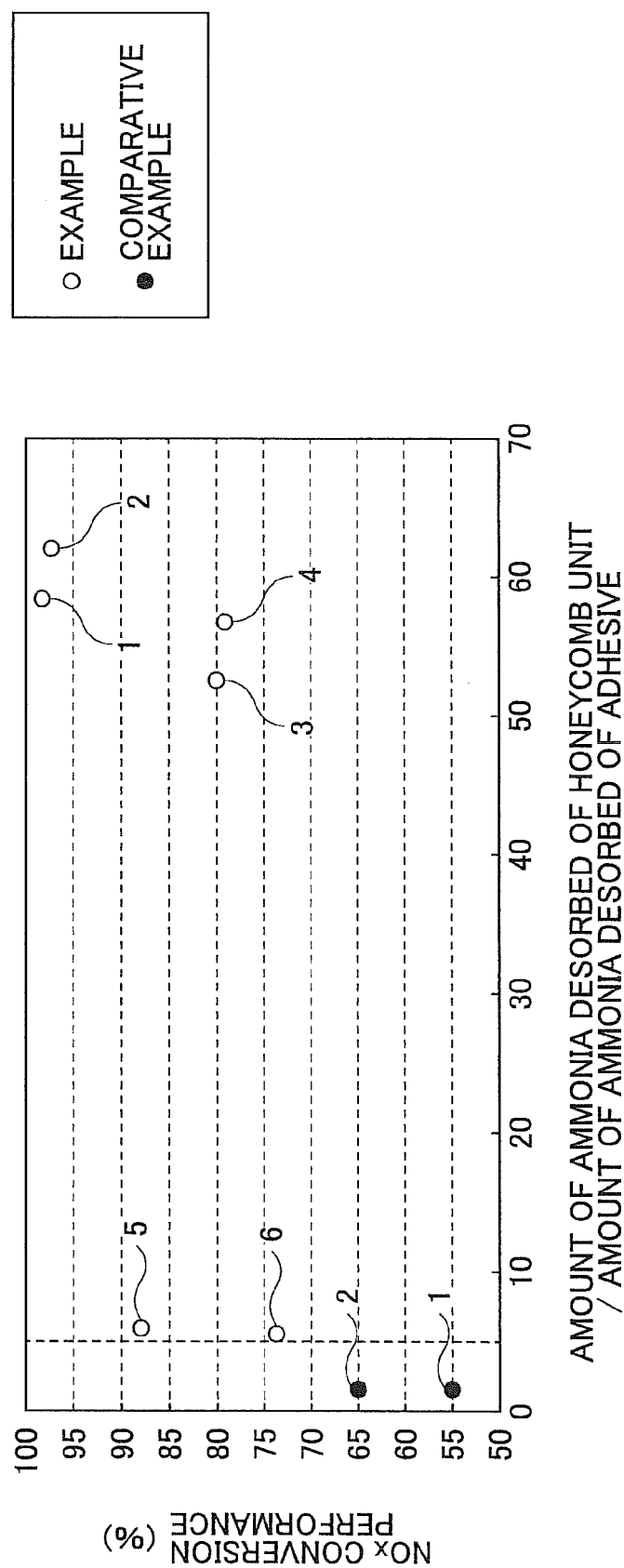

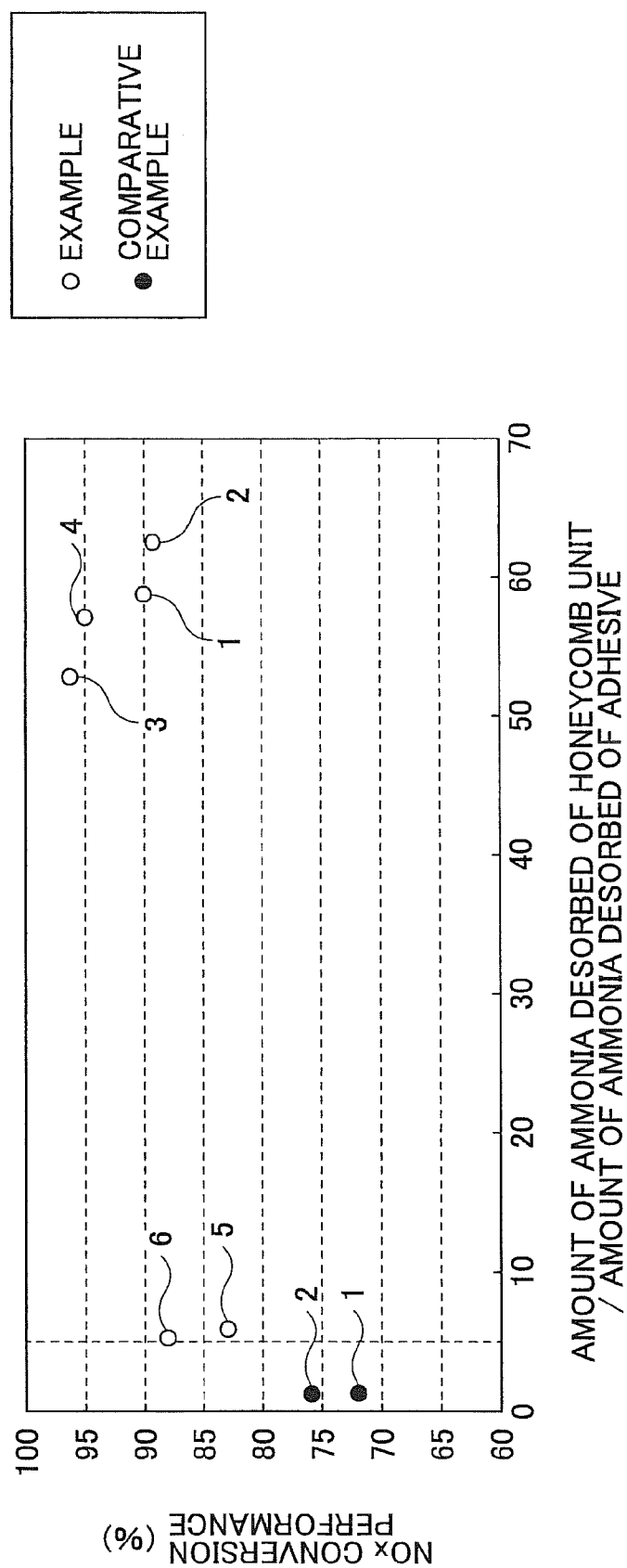

HONEYCOMB STRUCTURE

CROSS-REFERENCE TO RELATED APPLICATIONS

The present application claims priority under 35 U.S.C. §119 to PCT/JP2008/059260 filed on May 20, 2008, the entire contents of which are incorporated herein by reference.

BACKGROUND OF THE INVENTION

1. Field of the Invention

The present invention relates to a honeycomb structure.

2. Description of the Related Art

Various technologies have been developed for converting automotive exhaust gases. However, with ever-growing traffic volumes, emission control measures currently being taken are hardly enough. In Japan and throughout the world, automotive emission control is expected to become stricter. Especially, regulation of NOx in diesel exhaust gases is becoming very strict. Conventionally, NOx reduction has been achieved by controlling combustion systems of engines. However, it is no longer possible to sufficiently reduce NOx solely by controlling combustion systems. To cope with this problem, a Nox conversion system (called a urea selective catalytic reduction (SCR) system) using ammonia as a reducing agent has been proposed as a diesel NOx conversion system. In the urea SCR system, urea is pyrolyzed to generate ammonia and NOx in exhaust gases is reduced by the generated ammonia. The ammonia is occluded in a catalyst carrier and reacts with and thereby reduces NOx in an exhaust gas passing through the catalyst carrier.

WO2005/063653 discloses a honeycomb structure used as a catalyst carrier in such a system. The disclosed honeycomb structure is produced by combining honeycomb units. Each of the honeycomb units is made by mixing γ-alumina, ceria, zirconia, zeolite, and the like with inorganic fibers and a binder for improving the strength, molding the mixture into a honeycomb shape, and firing the molded body. Thus, the disclosed honeycomb structure has improved strength that is an important factor for a catalyst carrier used for vehicles.

The entire contents of WO 2005/063653 are incorporated herein by reference.

SUMMARY OF THE INVENTION

According to an aspect of the present invention, a honeycomb structure includes honeycomb units. Each of the honeycomb units has a longitudinal direction and includes inorganic particles, an inorganic binder, and cell walls defining cells extending along the longitudinal direction from one end face to another end face. The honeycomb units are bonded together via an adhesive such that each longitudinal direction is substantially in parallel. An amount of ammonia desorbed per unit mass of the honeycomb units is about 5 to about 100 times greater than an amount of ammonia desorbed per unit mass of the adhesive. The amount of ammonia desorbed per unit mass of the honeycomb units and the amount of ammonia desorbed per unit mass of the adhesive are measured by an $NH_3$-TPD method.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 3A through 3C are graphs showing the NOx-conversion performance of honeycomb structures in relation to the ratio of the amount of ammonia desorbed per unit mass of a honeycomb unit to the amount of ammonia desorbed per unit mass of an adhesive (amount of ammonia desorbed per unit mass of honeycomb unit/amount of ammonia desorbed per unit mass of adhesive) according to Examples and Comparative Examples.

DESCRIPTION OF THE PREFERRED EMBODIMENTS

Figure 1:
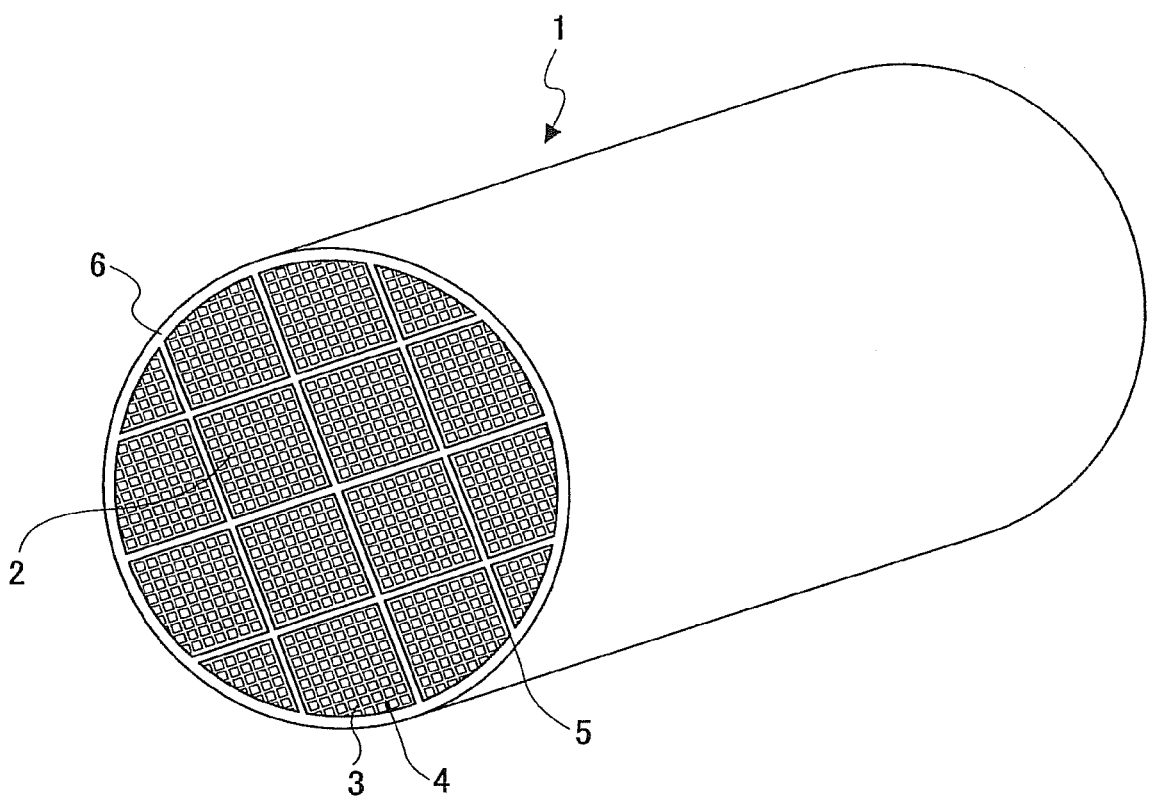
FIG. 1 is a perspective view of a honeycomb structure according to an embodiment of the present invention.

Preferred embodiments of the present invention are described below with reference to the accompanying drawings.

In a honeycomb structure used as a carrier of a NOx-reduction catalyst for vehicles which employs reduction reaction of ammonia, ammonia adsorbed in the honeycomb structure reacts with and thereby reduces NOx in exhaust gases when the NOx reaches the NOx-reduction catalyst. Such a honeycomb structure is configured to cause NOx to be adsorbed on a portion around the NOx-reduction catalyst being carried on the honeycomb structure.

Meanwhile, a honeycomb structure may be manufactured by combining plural honeycomb units that are comparatively small and easy to produce. In such a honeycomb structure, an adhesive including inorganic materials is used to bond honeycomb units together. The adhesive typically has an acid center and easily adsorbs ammonia. Therefore, it is presumed that a part of ammonia provided for NOx reduction is adsorbed by the adhesive and becomes unusable for NOx reduction.

A honeycomb structure according to an embodiment of the present invention includes plural honeycomb units each including inorganic particles and an inorganic binder and including cell walls that define multiple cells (or through holes) extending along a longitudinal direction from one end face to the other. The honeycomb units are bonded together by an adhesive such that the cells are oriented substantially in the same direction. In the honeycomb structure of this embodiment, the amount of ammonia desorbed per unit mass of the honeycomb units, measured by an $NH_3$-TPD method, is about 5 to about 100 times greater than the amount of ammonia desorbed per unit mass of the adhesive. This configuration makes it possible to reduce the adsorption of ammonia by the adhesive and thereby to reduce the amount of ammonia that becomes unusable for NOx reduction.

If the amount of ammonia desorbed per unit mass of the honeycomb units is greater than or equal to about 5 times the amount of ammonia desorbed per unit mass of the adhesive, the influence of ammonia adsorption by the adhesive may not become excessive, the use efficiency of ammonia for NOx reduction may not be reduced, and the release of ammonia into exhaust gases may be prevented. Meanwhile, if the amount of ammonia desorbed per unit mass of the honeycomb units is less than or equal to about 100 times the amount of ammonia desorbed per unit mass of the adhesive, a honeycomb structure may be produced without difficulty.

The absolute value of the amount of ammonia desorbed per unit mass of the honeycomb units is preferably between about 200 μmol/g and about 700 μmol/g. If the absolute value of the amount of ammonia desorbed per unit mass of the honeycomb units is greater than or equal to about 200 µmol/g, it may not be necessary to increase the size of the honeycomb structure to achieve sufficient NOx-conversion performance. If the absolute value of the amount of ammonia desorbed per unit mass of the honeycomb units is less than or equal to about 700 µmol/g, the porosity of the cell walls may not become insufficient, exhaust gases may easily penetrate into the cell walls, and NOx-conversion performance may not become insufficient.

In the $NH_3$-TPD method, ammonia is adsorbed on a specimen under predetermined conditions, the specimen is heated to desorb the ammonia, and the amount of desorbed ammonia is measured using a thermal desorption spectrometer (a TPD device). Details of measurement conditions are described later.

In addition to the improved strength, the honeycomb structure disclosed in WO2005/063653 also has other superior characteristics as a catalyst carrier for vehicles. For example, the honeycomb structure increases contact areas of catalytic components with exhaust gases and thereby improves the reactivity of the catalytic components. Meanwhile, a honeycomb structure as disclosed in WO2005/063653 is produced by combining plural honeycomb units. More specifically, a honeycomb structure is produced by bonding together adjacent honeycomb units with an adhesive including inorganic materials. Normally, exhaust gases do not penetrate into an adhesive and therefore the adhesive does not contributed to NOx reduction. A typical adhesive used for bonding honeycomb units is made of inorganic materials that are similar in terms of heat resistance and strength to those of the honeycomb units. Particularly, porous inorganic materials with ammonia adsorption capability are preferably used.

Such an adhesive adsorbs ammonia but does not contribute to NOx reduction. In other words, the adhesive just consumes ammonia and may release the ammonia when it is not desired. If an adhesive made of such materials is present in a honeycomb structure, the adhesive may adsorb a part of ammonia necessary for NOx reduction and thereby reduce the use efficiency of ammonia. Further, the ammonia adsorbed on the adhesive may be released because of change in environmental conditions of the honeycomb structure. If the released ammonia is discharged together with exhaust gases, it may cause additional environmental pollution. In such a case, an extra system for removing ammonia from exhaust gases that have passed through a NOx-reduction catalyst may become necessary.

Embodiments of the present invention provide a honeycomb structure that makes it possible to reduce the adsorption of ammonia by an adhesive and thereby to reduce the amount of ammonia that becomes unusable for NOx conversion in an automotive exhaust gas NOx conversion system employing reduction reaction of ammonia.

FIG. 1 is a perspective view of an exemplary honeycomb structure according an embodiment of the present invention. A honeycomb structure 1 shown in FIG. 1 includes multiple honeycomb units 2 that are bonded together by an adhesive 5. Each of the honeycomb units 2 is formed such that cells 3 are arranged parallel to the longitudinal direction of the honeycomb unit. The side (the surface without cell openings) of the honeycomb structure 1 is preferably covered by a coating layer 6 to increase its strength. As exemplified by a perspective view of FIG. 2, the honeycomb unit 2 of the honeycomb structure 1 includes multiple cell walls 4 that define multiple cells 3 extending along the longitudinal direction of the honeycomb unit 2.

<Materials of Honeycomb Unit>

A honeycomb unit of this embodiment preferably includes inorganic particles and an inorganic binder and may also include inorganic fibers. The inorganic particles preferably include zeolite. Below, components of a honeycomb unit and their materials are described.

(Inorganic Particles)

A honeycomb unit of a honeycomb structure of this embodiment is mainly made of inorganic particles that give strength required for a catalyst carrier to the honeycomb structure and have an ammonia adsorption capability. A honeycomb unit of a honeycomb structure of this embodiment may include zeolite particles and inorganic particles other than zeolite. Examples of inorganic particles other than zeolite include, but are not limited to, alumina, silica, zirconia, titania, ceria, mullite, and their precursors. Among them, alumina and zirconia are particularly preferable, and γ-alumina and boehmite are also preferably used. The above inorganic particles may be used individually or in combination.

Before being fired, as are most of industrially-available inorganic compound particles, raw inorganic particles and raw zeolite particles in a honeycomb structure of this embodiment include hydroxyl groups. The hydroxyl groups are thought to cause dehydration condensation reaction when the honeycomb unit is fired and thereby strengthen the bond between the particles. Particularly, raw inorganic particles such as alumina particles are thought to be firmly bonded by dehydration condensation reaction during firing.

In a honeycomb structure of this embodiment, the average diameter of secondary particles of raw inorganic particles other than zeolite is preferably less than or equal to the average diameter of secondary particles of zeolite particles. More specifically, the average diameter of inorganic particles other than zeolite is preferably between about 1/10 and about 1/1 of the average diameter of zeolite particles. With inorganic particles having such a small average diameter, the strength of a honeycomb unit may be improved by the bonding force of the inorganic particles.

The content of inorganic particles other than zeolite particles in a honeycomb unit is preferably between about 3 mass % and about 30 mass % and more preferably between about 5 mass % and about 20 mass %. If the content of inorganic particles other than zeolite particles is greater than or equal to about 3 mass %, the contribution of the inorganic particles to the strength of the honeycomb unit may not become insufficient. Meanwhile, if the content of inorganic particles other than zeolite particles is less than or equal to about 30 mass %, the proportion of zeolite, which serves as a NOx-reduction catalyst, may not become insufficient and the NOx-conversion performance of the honeycomb unit may not be reduced.

(Zeolite)

Zeolite is bound by an inorganic binder. Zeolite functions as a NOx-reduction catalyst as well as an ammonia gas adsorbent. Therefore, zeolite is preferably used as an exhaust gas NOx-reduction catalyst of a honeycomb structure of this embodiment. Any kind of zeolite may be used for the honeycomb unit as long as it has desired catalytic ability and ammonia gas adsorption ability. Examples of zeolites include β-zeolite, Y-zeolite, ferrierite, ZSM-5 zeolite, mordenite, faujasite, zeolite A, and zeolite L. Also, ion-exchanged zeolite may be used. For example, zeolite ion-exchanged by at least one of metal species including Cu, Fe, Ni, Zn, Mn, Ag, Ti, V, and Co is preferably used. Alternatively, zeolite may be ion-exchanged after formed into a honeycomb unit. The above zeolites may be used individually or in combination.

The molar ratio between silica and alumina (silica/alumina ratio) of zeolite is preferably between about 1 and about 100. The silica/alumina ratio affects the acidity of zeolite, i.e., the adsorption and reactivity of reactive molecules. Therefore, a preferable silica/alumina ratio is determined according to the purpose.

The content of zeolite per unit apparent volume of a honeycomb unit is preferably between about 250 g/L and about 700 g/L. In other words, the content of zeolite in a honeycomb unit is preferably between about 50 mass % and about 80 mass %. The catalytic and adsorption abilities of zeolite increase as the content of zeolite in a honeycomb structure increases. However, just increasing the content of zeolite makes it necessary to decrease the contents of other components such as inorganic oxide, inorganic fibers, and inorganic binder, and therefore may decrease the strength of a fired honeycomb unit.

Zeolite preferably includes secondary particles and the average diameter of secondary particles of zeolite is preferably between about 0.5 μm and about 10 μm. The average diameter of secondary particles may be measured by using raw zeolite particles forming secondary particles before the particles are fired to form a honeycomb unit.

(Inorganic Binder)

As the inorganic binder, for example, an inorganic sol, a clay binder, or the like may be used. Examples of inorganic sols include alumina sol, silica sol, titania sol, sepiolite sol, attapulgite sol, and water glass. Examples of clay binders include terra alba, kaolin, montmorillonite, and multiple chain structure clay (e.g., sepiolite and attapulgite). The above inorganic sols and clay binders may be used individually or in combination. The solid content of inorganic binder in a honeycomb unit is preferably between about 5 mass % and about 30 mass % and more preferably between about 10 mass % and about 20 mass %. If the content of inorganic binder is out of the range between about 5 mass % and about 30 mass %, the moldability of the honeycomb unit may be reduced.

(Inorganic Fibers)

A honeycomb unit of a honeycomb structure of this embodiment may also include inorganic fibers. As the inorganic fibers used for a honeycomb unit, for example, any one of or a combination of alumina fibers, silica fibers, silicon carbide fibers, silica-alumina fibers, glass fibers, potassium titanate fibers, aluminum borate fibers, and the like may be used. The inorganic fibers are mixed with zeolite and an inorganic binder to form a mixture of materials, and the mixture is molded and fired to form a honeycomb unit. The inorganic fibers together with the inorganic binder, zeolite, and the like form a fiber-reinforced fired body and improve the strength of the honeycomb unit.

Inorganic fibers are inorganic materials having a high aspect ratio (fiber length/fiber diameter) and improve particularly the bending strength. The aspect ratio of inorganic fibers is preferably between about 2 and about 1000, more preferably between about 5 and about 800, and still more preferably between about 10 and about 500. If the aspect ratio of inorganic fibers is greater than or equal to about 2, the effect of improving the strength of the honeycomb unit may not become insufficient. On the other hand, if the aspect ratio of inorganic fibers is less than or equal to about 1000, the inorganic fibers may not cause clogging of a mold and may not reduce the moldability of the honeycomb unit. Also, inorganic fibers with an aspect ratio as described above may not easily break during molding such as extrusion molding, and therefore their fiber lengths may not become inconsistent and the strength of the honeycomb unit may not become insufficient. If the inorganic fibers have various aspect ratios, an average value of the aspect ratios may be used. Whiskers may also be used as inorganic fibers.

The content of inorganic fibers in a honeycomb unit is preferably between about 3 mass % and about 50 mass %, more preferably between about 3 mass % and about 30 mass %, and still more preferably between about 5 mass % and about 20 mass %. If the content of inorganic fibers is greater than or equal to about 3 mass %, the strength of the honeycomb unit may not become insufficient. On the other hand, if the content of inorganic fibers is less than or equal to about 50 mass %, the proportion of zeolite, which serves as a NOx-reduction catalyst, may not become insufficient and the NOx-conversion performance of the honeycomb structure may not be reduced.

(Catalytic Component)

The cell walls of a honeycomb unit of a honeycomb structure of this embodiment may also support a catalytic component. Examples of catalytic components include, but are not limited to, noble metals, alkali metal compounds, and alkaline-earth metal compounds. As noble metals, for example, any one of or a combination of platinum, palladium, and rhodium may be used. As alkali metal compounds, for example, any one of or a combination of potassium compounds, sodium compounds, and the like may be used. As alkaline-earth metal compounds, for example, barium compounds or the like may be used.

<Honeycomb Unit>

A plane orthogonal to the longitudinal direction of cells (hereafter, simply called a cross section) of a honeycomb unit of a honeycomb structure of this embodiment may have a square shape, a rectangular shape, a hexagonal shape, or a fan-like shape.

Figure 2:
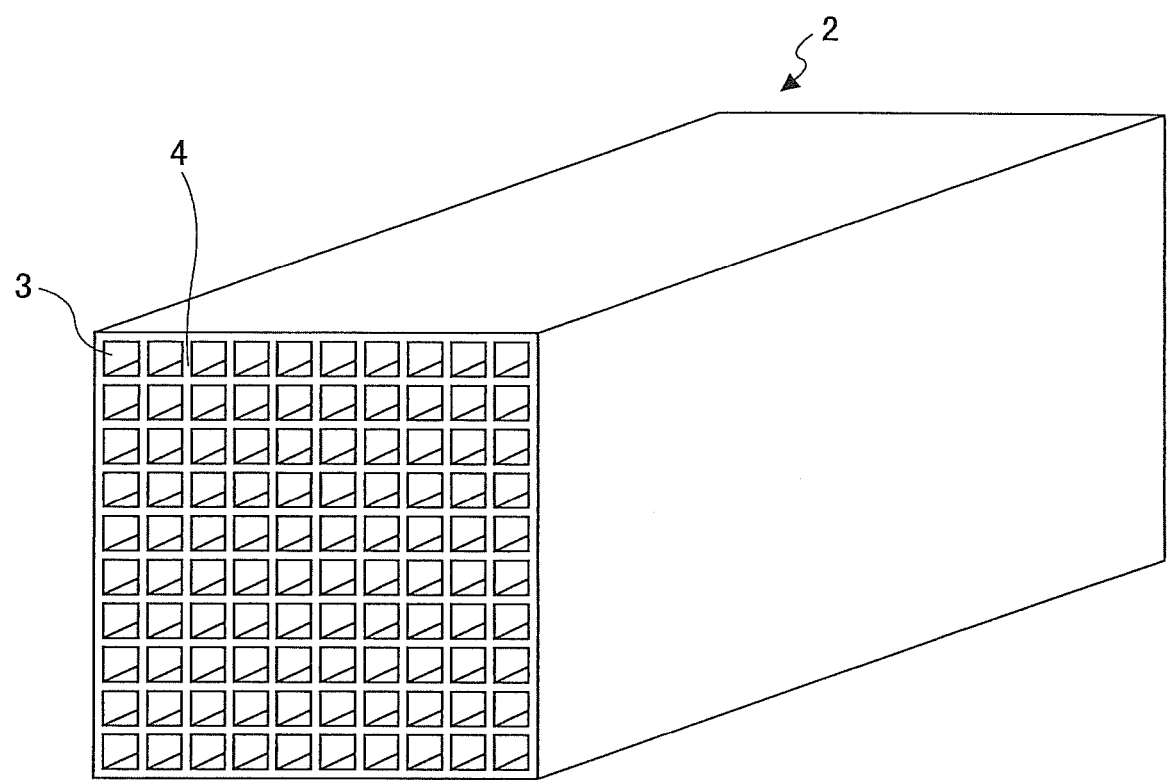
FIG. 2 is a perspective view of a honeycomb unit constituting a part of the honeycomb structure of FIG. 1.

FIG. 2 shows an exemplary honeycomb unit. The honeycomb unit 2 includes cell walls 4 defining cells 3 extending from left to right (from the near side to the far side). The thickness of the cell walls 4 is preferably, but is not limited to, between about 0.10 mm and about 0.50 mm and more preferably between about 0.15 mm and about 0.35 mm. If the thickness of the cell walls 4 is greater than or equal to about 0.10 mm, the strength of the honeycomb unit may not become insufficient. If the thickness of the cell walls 4 is less than or equal to about 0.50 mm, the exhaust gas can easily penetrate into the cell walls 4 and the exhaust gas conversion performance may not become insufficient. The opening ratio, which indicates an area ratio of cells of a honeycomb unit in a cross section orthogonal to the cells, is preferably between about 40% and about 80%. An opening ratio of about 40 to about 80% is preferable to keep the pressure loss below a certain level while maintaining the volume of cell walls, which serve as catalytic component carriers, above a certain level.

The number of cells per unit cross-sectional area is preferably between about 15.5 cells/cm$^2$ and about 93 cells/cm$^2$ (about 100 to about 600 cpsi), and more preferably between about 31 cells/cm$^2$ and about 77.5 cells/cm$^2$ (about 200 to about 500 cpsi).

The cross sections of the cells 3 of the honeycomb unit may have any shape. Although the cross sections of the cells 3 shown in FIG. 2 have a square shape, the cross sections of the cells 3 may have any other shape such as a substantially-triangular shape, a substantially-hexagonal shape, or a circular shape.

<Production of Honeycomb Unit>

An exemplary method of producing a honeycomb unit of a honeycomb structure of this embodiment is described below. First, a raw material paste including zeolite and an inorganic binder as main components is prepared. The raw material paste is extrusion-molded into a honeycomb unit molded body. The raw material paste may also include inorganic fibers, inorganic particles other than zeolite, an organic binder, a dispersion medium, and/or a molding aid. As the organic binder, for example, any one of or a combination of methylcellulose, carboxymethylcellulose, hydroxyethylcellulose, polyethylene glycol, phenolic resin, epoxy resin, and the like may be used. The amount of organic binder is preferably between about 1% and about 10% of the total mass (100%) of the solid content of all the materials. As the dispersion medium, for example, water, an organic solvent (such as toluene), an alcohol (such as methanol), or the like may be used. As the molding aid, for example, ethylene glycol, dextrin, fatty acid soap, polyalcohol, or the like may be used.

The raw material paste is preferably prepared by mixing the raw materials using a mixer, an attritor, or the like and by kneading the mixture using a kneader or the like. The raw material paste is preferably molded into a shape having cells, for example, by extrusion molding.

Next, the obtained honeycomb unit molded body is dried using a drying apparatus such as a microwave drying apparatus, a hot-air drying apparatus, a dielectric drying apparatus, a reduced pressure drying apparatus, a vacuum drying apparatus, or a freeze drying apparatus. The dried honeycomb unit molded body is preferably degreased. Although degreasing conditions may be determined freely depending on the kinds and amounts of organic materials in the honeycomb unit molded body, degreasing is preferably performed at about 400° C. for about two hours. Then, the dried and degreased honeycomb unit molded body is fired. The firing temperature is preferably between about 600° C. and about 1200° C. and more preferably between about 600° C. and about 1000° C. If the firing temperature is greater than or equal to about 600° C., sintering of zeolite and the like may proceed smoothly and the strength of the honeycomb unit may increase. If the firing temperature is less than or equal to about 1200° C., zeolite crystals may not easily collapse and sintering may not proceed too far, and it becomes easier to produce a porous honeycomb unit.

<Honeycomb Structure>

A honeycomb structure according to an embodiment of the present invention includes plural honeycomb units each of which includes cell walls that define multiple cells extending along a longitudinal direction from one end face to the other. The honeycomb units are bonded together by an adhesive such that the cells are oriented substantially in the same direction. The configurations of the honeycomb units are as described above.

In the honeycomb structure of this embodiment, the amount of ammonia desorbed per unit mass of the honeycomb units, measured by an $NH_3$-TPD method, is about 5 to about 100 times greater than the amount of ammonia desorbed per unit mass of the adhesive.

<Method of Measuring Amount of Ammonia Desorbed>

An exemplary method, employing $NH_3$-TPD, of measuring the amount of ammonia desorbed is described below. First, a small amount of (powdered) measurement sample is heated in a vacuum to 300° C. (at a rate of temperature rise of 10° C./min) and is left for 60 minutes. Next, the sample is cooled to 100° C. and put into a steady state. Then, an ammonia gas is introduced for 30 minutes while maintaining the temperature at 100° C. so that ammonia is adsorbed on the sample. The ammonia gas is discharged while maintaining the temperature of the sample at 100° C. and the sample kept in a vacuum for 30 minutes. After that, the sample is heated at a rate of 10° C./min up to 600° C. while introducing a helium gas at 50 ml/min. During this step, ammonia desorbing into the helium gas is measured and the cumulative amount of measured ammonia is used as the amount of ammonia desorbed. The amount of ammonia desorbed per unit mass is calculated based on the mass of the sample.

In the examples described below, Automatic Temperature Programmed Desorption Spectrometer TPD-1-ATw of BEL Japan, Inc. was used. The amount of each measurement sample used in the examples was about 0.05 g and ammonia was detected by quadrupole mass spectrometry (MS) ($m/z=16$, $NH2+$).

<Adhesive>

As an adhesive for bonding honeycomb units, for example, a mixture of an inorganic binder and inorganic particles; a mixture of an inorganic binder and inorganic fibers; a mixture of an inorganic binder, inorganic particles, and inorganic fibers; or the like may be used. The adhesive may also include an organic binder. As the organic binder, for example, any one of or a combination of polyvinyl alcohol, methylcellulose, ethylcellulose, carboxymethylcellulose, and the like may be used. <Production of Honeycomb Structure>

An exemplary method of producing a honeycomb structure including multiple honeycomb units is described below. An adhesive is applied to the sides of honeycomb units produced as described above and the honeycomb units are bonded together. Next, the adhesive is solidified by drying to produce a honeycomb unit bonded body having a predetermined size. The honeycomb unit bonded body is formed into a desired shape by cutting its sides. The adhesive is composed, for example, of materials as described above.

The thickness of adhesive layers for bonding the honeycomb units is preferably between about 0.5 mm and about 2 mm. The number of honeycomb units to be bonded may be determined freely depending on the size of a honeycomb structure to be produced. The honeycomb unit bonded body, which is made by bonding multiple honeycomb units by an adhesive, may be cut and ground according to the shape of a honeycomb structure to be produced.

Next, a coating material is applied to the outer surface (the surface without cell openings) of the honeycomb unit bonded body and is solidified by drying to form a coating layer. The coating layer protects the outer surface of the honeycomb structure and improves the strength. The coating material may be made of the same materials as those of the adhesive or may be made of materials different from those of the adhesive. Also, the mixing ratio of materials of the coating material may be the same as or different from that of the adhesive. The thickness of the coating layer is preferably between about 0.1 mm and about 3 mm. The coating layer may be omitted.

After bonding honeycomb units by an adhesive, it is preferable to heat the honeycomb unit bonded body. In the case where the coating layer is formed, the honeycomb structure is preferably heated after the adhesive layer and the coating layer are formed. Particularly, if the adhesive layer and/or the coating layer includes an organic binder, it is preferable to heat the honeycomb structure to degrease the organic binder. Although heating conditions may be determined freely depending on the kinds and amounts of contained organic materials, heating is preferably performed at about 700° C. for about two hours.

FIG. 1 shows an exemplary honeycomb structure 1 shaped like a cylinder and made by combining multiple honeycomb units 2 each of which is a cuboid and has a square cross section. The honeycomb structure 1 is made by bonding together the honeycomb units 2 using the adhesive 5, forming the bonded honeycomb units into a cylindrical shape by cutting the outer surface, and forming the coating layer 6 on the outer surface. Alternatively, for example, the honeycomb structure 1 with a cylindrical shape may be made by bonding honeycomb units 2 with fan-shaped and square-shaped cross sections. In this case, the cutting and grounding processes may be omitted.

EXAMPLES

The embodiment of the present invention is described below in more detail by way of examples where honeycomb structures were produced by varying conditions. However, the present invention is not limited to the examples described below.

Example 1

(Production of Honeycomb Unit)

The following materials were mixed: 2250 parts by mass of zeolite particles (Fe ion-exchanged β-zeolite, average particle diameter: 2 µm), 680 parts by mass of alumina fibers (average fiber diameter: 6 µm, average fiber length: 100 µm), 2600 parts by mass of alumina sol (solid concentration: 20 mass %), and 320 parts by mass of methylcellulose used as an organic binder. Further, small amounts of a plasticizer, a surfactant, and a lubricant were added to the mixture. Then, the mixture was kneaded while adjusting its viscosity by adding water to obtain a mixed composition for molding. Next, the mixed composition was extrusion-molded using an extruder to obtain raw honeycomb molded bodies. The Fe ion-exchanged zeolite was prepared by impregnating zeolite particles with a ferric nitrate ammonium solution for Fe ion exchange. The amount of ion-exchange was measured by IPC emission analysis using ICPS-8100 (Shimadzu Corporation).

The obtained raw honeycomb molded bodies were sufficiently dried using a microwave drying apparatus and a hot-air drying apparatus and then degreased at 400° C. for two hours. After that, the honeycomb unit molded bodies were fired at 700° C. for two hours. As a result, square-pillar honeycomb units with a height of 35 mm, a width of 35 mm, and a length of 150 mm were obtained. The cells of the honeycomb units had a quadrangular (square) shape. The cell density was 93 cells/cm$^2$ and the thickness of the cell walls was 0.2 mm. Tables 1 and 3 below show materials used for the honeycomb units and the amounts of the materials, and table 2 below shows the amounts of ammonia desorbed of zeolites.

Table 1 also shows the amounts of ammonia desorbed per unit mass of honeycomb units, the amounts of ammonia desorbed per unit mass of adhesives, and the ratios of the amounts of ammonia desorbed per unit mass of honeycomb units to the amounts of ammonia desorbed per unit mass of adhesives (amount of ammonia desorbed per unit mass of honeycomb unit/amount of ammonia desorbed per unit mass of adhesive).

TABLE 2

|  | Material | Amount of ammonia desorbed (µmol/g) |
|---|---|---|
| Carrier | Fe ion-exchanged β-zeolite | 420 |
|  | Cu ion-exchanged ZSM-5 zeolite | 390 |
| Adhesive | Silica | 8.3 |
|  | Alumina | 9.0 |
|  | ZSM-5 zeolite | 110 |
|  | Cu ion-exchanged ZSM-5 zeolite | 390 |

TABLE 3

| Composition of carrier (parts by mass) | Alumina fibers (Average fiber length 100 µm) (Average fiber diameter 6 µm) | 680 |
|---|---|---|
|  | Alumina sol | 2600 |
|  | Methylcellulose | 320 |

(Production of Honeycomb Structure)

An adhesive paste was applied to the sides of the produced honeycomb units to form an adhesive layer with a thickness of 1 mm. Then, four rows and four columns of the honeycomb units were bonded together and solidified by drying at 120° C. to form a honeycomb unit bonded body with a substantially cuboid shape. The adhesive paste was prepared by mixing 14.34 parts by mass of γ-alumina particles (average particle diameter: 2 µm), 16.37 parts by mass of aluminum borate whiskers (average fiber length: 15 µm), 17.35 parts by mass of alumina sol (solid concentration: 20 mass %), 0.05 parts by mass of carboxymethyl cellulose, 1.9 parts by mass of water, and 0.98 parts by mass of polyvinyl alcohol.

TABLE 1

|  | Main material of carrier | | | Main material of adhesive | | Weight per unit volume of carrier (g/L) | Amount of ammonia desorbed of honeycomb unit (µmol/g) | Amount of ammonia desorbed of adhesive (µmol/g) | Amount of ammonia desorbed of honeycomb unit/Amount of ammonia desorbed of adhesive | Evaluation (NOx conversion performance %) | | |
|---|---|---|---|---|---|---|---|---|---|---|---|---|
|  | Zeolite type | Relative amount (parts by mass) | Metal used for ion-exchange | Material | Relative amount (parts by mass) |  |  |  |  | 200° C. | 300° C. | 400° C. |
| Example 1 | β-zeolite | 2250 | Fe | Alumina | 14.34 | 388 | 275 | 4.7 | 58.5 | 98 | 90 | 84 |
| Example 2 | β-zeolite | 2250 | Fe | Silica | 14.34 | 390 | 274 | 4.4 | 62.3 | 97 | 89 | 83 |
| Example 3 | ZSM-5 zeolite | 2250 | Cu | Alumina | 14.34 | 401 | 247 | 4.7 | 52.6 | 80 | 96 | 88 |
| Example 4 | ZSM-5 zeolite | 2250 | Cu | Silica | 14.34 | 397 | 250 | 4.4 | 56.8 | 79 | 95 | 88 |
| Example 5 | β-zeolite | 2250 | Fe | ZSM-5 zeolite | 14.34 | 387 | 276 | 47.1 | 5.9 | 88 | 83 | 78 |
| Example 6 | ZSM-5 zeolite | 2250 | Cu | ZSM-5 zeolite | 14.34 | 399 | 249 | 47.1 | 5.3 | 74 | 88 | 80 |
| Comparative example 1 | ZSM-5 zeolite | 2250 | — | ZSM-5 zeolite | 14.34 | 380 | 75 | 47.1 | 1.6 | 55 | 72 | 70 |
| Comparative example 2 | ZSM-5 zeolite | 2250 | Cu | Cu ion-exchanged ZSM-5 zeolite | 14.34 | 397 | 247 | 163.6 | 1.5 | 65 | 76 | 73 |

The produced honeycomb unit bonded body was formed into a cylindrical shape by cutting its side walls with a diamond cutter. Then, the adhesive paste described above was applied to the outer surface of the cylindrical honeycomb unit bonded body to form a coating layer with a thickness of 0.5 mm. The produced cylindrical honeycomb unit bonded body had substantially the same shape as that of the honeycomb structure 1 shown in FIG. 1. The cylindrical honeycomb unit bonded body was solidified by drying at 120° C. and kept in a temperature of 700° C. for two hours to degrease the adhesive layer and the coating layer. As a result, a cylindrical honeycomb structure with a diameter of about 144 mm and a length of about 150 mm was obtained. The composition of the adhesive paste is shown in tables 1 and 4 and the amounts of ammonia desorbed of γ-alumina, silica, and zeolite, which are main materials of the adhesive paste, are shown in table 2.

TABLE 4

| Composition of adhesive (parts by mass) | Aluminum borate whiskers | 16.37 |
|---|---|---|
| | Alumina sol | 17.35 |
| | Carboxymethyl cellulose | 0.05 |
| | Water | 1.90 |
| | Polyvinyl alcohol | 0.98 |

(Performance Evaluation of Honeycomb Structure)

The produced honeycomb unit was formed by cutting into a cylindrical shape with a radius of 15 mm and a length of 50 mm and the cylindrical honeycomb unit was cut into two along the longitudinal direction to obtain two semi-cylindrical honeycomb units. Each of the cut surfaces of the two semi-cylindrical honeycomb units was cut off by 0.5 mm and the adhesive paste described above was applied to the cut-off surfaces. Then, the semi-cylindrical honeycomb units were bonded together to form a substantially cylindrical honeycomb unit. The thickness of the applied adhesive paste was determined such that the thickness of the adhesive layer would become 1 mm after solidifying by drying. The substantially cylindrical honeycomb unit was solidified by drying at 120° C. to produce a substantially cylindrical honeycomb structure having the adhesive layer in the middle for use as an evaluation sample. The substantially cylindrical honeycomb structure (the evaluation sample) had a diameter of about 30 mm and a length of about 50 mm.

The produced evaluation sample was artificially aged by heating it at 700° C. for five hours. Then, while maintaining the temperature (reaction temperature) at 200° C., a simulated automotive exhaust gas having a composition as shown in table 5 and having a temperature of 200° C. was caused to pass through the evaluation sample. Then, the reduction rate (%) of NO in the simulated gas after passing through the evaluation sample was measured to evaluate the NOx-conversion performance. Also, the NOx-conversion performance of the evaluation sample was evaluated in a similar manner by changing the reaction temperature and the temperature of the simulated gas to 300° C. and 400° C. The evaluation results are shown in table 1. In table 1, the weight per unit volume of the honeycomb structure (carrier) is provided together with the evaluation results.

Table 1 also shows the amount of ammonia desorbed per unit mass of the honeycomb unit, the amount of ammonia desorbed per unit mass of the adhesive, and the ratio of the amount of ammonia desorbed per unit mass of the honeycomb unit to the amount of ammonia desorbed per unit mass of the adhesive (amount of ammonia desorbed per unit mass of honeycomb unit/amount of ammonia desorbed per unit mass of adhesive).

TABLE 5

| N2 | Balance |
|---|---|
| CO2 | 5 vol % |
| O2 | 14 vol % |
| NO | 350 ppm |
| NH3 | 350 ppm |
| H2O | 5 vol % |
| SV | 40000/hr |
| Gas temperature | 200-400° C. |

Examples 2-6 and Comparative Examples 1 and 2

As shown in table 1, honeycomb structures and evaluation samples of examples 2-6 and comparative examples 1 and 2 were produced in substantially the same manner as in example 1 except that different kinds of zeolites were used for the honeycomb unit and different materials were used for the adhesive. The amounts of ammonia desorbed of the respective zeolite types and main materials of the adhesive are shown in table 2. The NOx-conversion performance of the evaluation samples was evaluated as in example 1 and the evaluation results are shown in table 1. Table 1 also shows the amounts of ammonia desorbed per unit mass of honeycomb units, the amounts of ammonia desorbed per unit mass of adhesives, and the ratios of the amounts of ammonia desorbed per unit mass of honeycomb units to the amounts of ammonia desorbed per unit mass of adhesives (amount of ammonia desorbed per unit mass of honeycomb unit/amount of ammonia desorbed per unit mass of adhesive).

Figure 3C:
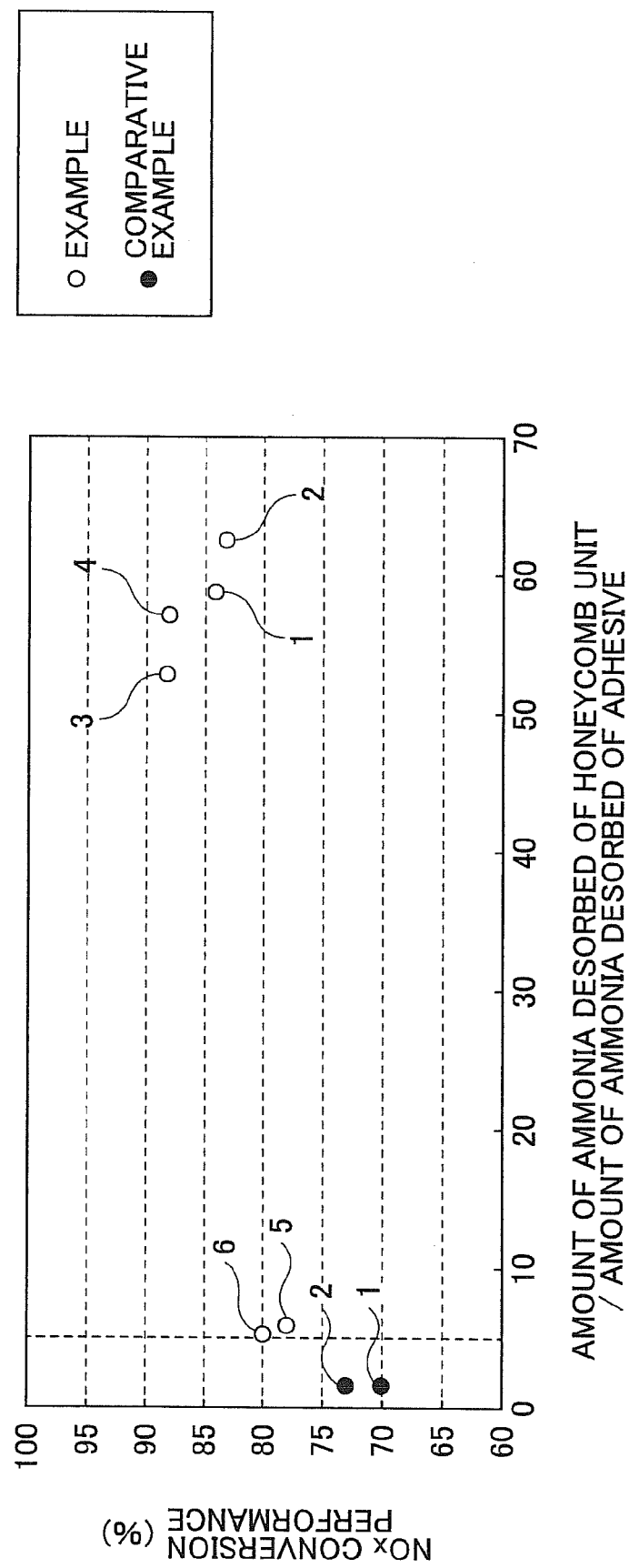

FIGS. 3A through 3C are graphs showing the NOx-conversion performance of honeycomb structures in relation to the ratio of the amount of ammonia desorbed per unit mass of the honeycomb unit to the amount of ammonia desorbed per unit mass of the adhesive (amount of ammonia desorbed per unit mass of honeycomb unit/amount of ammonia desorbed per unit mass of adhesive) according to Examples and Comparative Examples. FIG. 3A shows the NOx-conversion performance at a reaction temperature of 200° C.; FIG. 3B shows the NOx-conversion performance at a reaction temperature of 300° C., and FIG. 3C shows the NOx-conversion performance at a reaction temperature of 400° C. In FIGS. 3A through 3C, ○ indicates examples and ● indicates comparative examples, and the numbers attached to ○ and ● indicate the numbers of the corresponding examples and comparative examples.

<Evaluation Results>

As shown in table 1 and FIGS. 3A through 3C, the honeycomb structures (evaluation samples) of examples 1 through 6 exhibited NOx-conversion performance of 74% to 98% at 200° C., 83% to 96% at 300° C., and 78% to 88% at 400° C. On the other hand, the honeycomb structures (evaluation samples) of comparative examples 1 and 2 exhibited NOx-conversion performance of 55% to 65% at 200° C., 72% to 76% at 300° C., and 70% to 73% at 400° C. Apparently, the evaluation results of examples 1 through 6 are superior to those of the comparative examples. Thus, the honeycomb structures of examples 1 through 6 are suitable for automotive exhaust-gas conversion.

A honeycomb structure according to embodiments of the present invention has high NOx-conversion performance and is therefore suitable for automotive exhaust gas conversion. Particularly, a honeycomb structure according to embodiments of the present invention is suitable for a NOx-reduction catalyst carrier used in a urea SCR system (a diesel exhaust gas conversion system using urea) that requires a zeolite catalyst.

Obviously, numerous modifications and variations of the present invention are possible in light of the above teachings. It is therefore to be understood that within the scope of the appended claims, the invention may be practiced otherwise than as specifically described herein.

What is claimed is:

1. A honeycomb structure comprising:
honeycomb units each having a longitudinal direction and comprising:
inorganic particles including zeolite;
an inorganic binder; and
cell walls defining cells extending along the longitudinal direction from one end face to another end face, the honeycomb units being bonded together via an adhesive such that each longitudinal direction is substantially in parallel, wherein
a content of the zeolite per liter of apparent volume of the honeycomb units is from about 250 g to about 700 g;
an amount of ammonia desorbed per unit mass of the honeycomb units measured by an $NH_3$-TPD method is from about 200 μmol/g to about 700 μmol/g; and
the amount of ammonia desorbed per unit mass of the honeycomb units is about 5 to about 100 times greater than an amount of ammonia desorbed per unit mass of the adhesive measured by the $NH_3$-TPD method.

2. The structure as claimed in claim 1, wherein the zeolite is ion-exchanged.

3. The honeycomb structure as claimed in claim 2, wherein the zeolite is ion-exchanged by at least one of Cu, Fe, Ni, Zn, Mn, Ag, Ti, V, and Co.

4. The honeycomb structure as claimed in claim 1, wherein the zeolite comprises at least one of β-zeolite, Y-zeolite, ferrierite, ZSM-5 zeolite, mordenite, faujasite, zeolite A, and zeolite L.

5. The honeycomb structure as claimed in claim 1, wherein the inorganic particles further include at least one of alumina particles, titania particles, silica particles, zirconia particles, and their precursors.

6. The honeycomb structure as claimed in claim 1, wherein the honeycomb units further include inorganic fibers.

7. The honeycomb structure as claimed in claim 6, wherein the inorganic fibers include at least one of alumina fibers, silica fibers, silicon carbide fibers, silica-alumina fibers, glass fibers, potassium titanate fibers, and aluminum borate fibers.

8. The honeycomb structure as claimed in claim 1, wherein the inorganic binder includes at least one of alumina sol, silica sol, titania sol, water glass, sepiolite sol, and attapulgite sol.

9. The honeycomb structure as claimed in claim 1, wherein a side of the honeycomb structure is covered by a coating layer.

10. The honeycomb structure as claimed in claim 5, wherein an average diameter of secondary particles of the inorganic particles other than the zeolite is less than or equal to an average diameter of secondary particles of the zeolite.

11. The honeycomb structure as claimed in claim 5, wherein an average diameter of the inorganic particles other than the zeolite is from about 1/10 to about 1/1 of an average diameter of the zeolite.

12. The honeycomb structure as claimed in claim 5, wherein a content of the inorganic particles other than the zeolite in the honeycomb units is from about 3 mass % to about 30 mass %.

13. The honeycomb structure as claimed in claim 1, wherein a molar ratio of silica to alumina of the zeolite is from about 1 to about 100.

14. The honeycomb structure as claimed in claim 1, wherein a content of the zeolite in the honeycomb units is from about 50 mass % to about 80 mass %.

15. The honeycomb structure as claimed in claim 1, wherein the zeolite includes secondary particles and an average diameter of the secondary particles is from about 0.5 μm to about 10 μm.

16. The honeycomb structure as claimed in claim 1, wherein a solid content of the inorganic binder in the honeycomb units is from about 5 mass % to about 30 mass %.

17. The honeycomb structure as claimed in claim 6, wherein an aspect ratio of the inorganic fibers is from about 2 to about 1000.

18. The honeycomb structure as claimed in claim 6, wherein a content of the inorganic fibers in the honeycomb units is from about 3 mass % to about 50 mass %.

19. The honeycomb structure as claimed in claim 1, wherein a catalytic component is provided on the cell walls.

20. The honeycomb structure as claimed in claim 19, wherein the catalytic component includes at least one of a noble metal, an alkali metal compound, and an alkaline-earth metal compound.

21. The honeycomb structure as claimed in claim 1, wherein a thickness of the cell walls is from about 0.10 mm to about 0.50 mm.

22. The honeycomb structure as claimed in claim 1, wherein an opening ratio of the honeycomb unit is from about 40% to about 80%.

23. The honeycomb structure as claimed in claim 1, wherein a number of cells per unit cross-sectional area of the honeycomb units is from about 15.5 cells/cm$^2$ to about 93 cells/cm$^2$.

24. The honeycomb structure as claimed in claim 1, wherein the adhesive comprises a mixture of an inorganic binder and inorganic particles, a mixture of an inorganic binder and inorganic fibers, or a mixture of an inorganic binder, inorganic particles and inorganic fibers.

25. The honeycomb structure as claimed in claim 1, wherein the adhesive is solidified by drying.

26. The honeycomb structure as claimed in claim 1, wherein a thickness of layers of the adhesive is from about 0.5 mm to about 2 mm.

27. The honeycomb structure as claimed in claim 1, wherein the honeycomb structure is so constructed to be used as an automotive-exhaust-gas conversion catalyst carrier.

28. The honeycomb structure as claimed in claim 27, wherein the honeycomb structure is so constructed to be used as a NOx-reduction catalyst carrier in a urea SCR system.

* * * * *